United States Patent
Brooker et al.

(10) Patent No.: US 11,499,597 B2
(45) Date of Patent: Nov. 15, 2022

(54) PIEZOELECTRIC BRAKING DEVICE

(71) Applicant: Thorlabs, Inc., Newton, NJ (US)

(72) Inventors: Jeffrey S. Brooker, Manassas, VA (US); Shane Patton, Bunker Hill, WV (US); Munkhtsooj Saikhanchimeg, Ashburn, VA (US)

(73) Assignee: Thorlabs, Inc., Newton, NJ (US)

( * ) Notice: Subject to any disclaimer, the term of this patent is extended or adjusted under 35 U.S.C. 154(b) by 330 days.

(21) Appl. No.: 16/776,888

(22) Filed: Jan. 30, 2020

(65) Prior Publication Data

US 2020/0248766 A1 Aug. 6, 2020

Related U.S. Application Data

(60) Provisional application No. 62/800,094, filed on Feb. 1, 2019.

(51) Int. Cl.
| | | |
|---|---|---|
| *F16D 63/00* | (2006.01) | |
| *G02B 21/26* | (2006.01) | |
| *H02N 2/04* | (2006.01) | |
| *F16D 121/28* | (2012.01) | |

(52) U.S. Cl.
CPC ............ *F16D 63/002* (2013.01); *G02B 21/26* (2013.01); *H02N 2/04* (2013.01); *F16D 2121/28* (2013.01)

(58) Field of Classification Search
CPC .......... F16D 63/002; G02B 21/26; H02N 2/04
See application file for complete search history.

(56) References Cited

U.S. PATENT DOCUMENTS

| | | | | | |
|---|---|---|---|---|---|
| 4,765,140 | A | * | 8/1988 | Imoto | F16D 29/00 188/72.4 |
| 5,365,296 | A | * | 11/1994 | Murakami | G02B 7/005 310/332 |
| 6,029,959 | A | * | 2/2000 | Gran | F16F 15/005 267/136 |
| 6,213,564 | B1 | * | 4/2001 | Face, Jr. | F16D 65/16 303/3 |
| 2001/0042661 | A1 | * | 11/2001 | Treyde | F16D 65/0012 188/73.36 |
| 2003/0103263 | A1 | | 6/2003 | Engelhardt et al. | |
| 2004/0035660 | A1 | * | 2/2004 | Coombs | F16F 9/36 188/322.17 |
| 2004/0040797 | A1 | * | 3/2004 | Plude | F16D 65/186 188/156 |
| 2011/0240410 | A1 | * | 10/2011 | Barrio | H02K 7/1025 188/171 |
| 2017/0146783 | A1 | | 5/2017 | Lundin | |
| 2020/0248766 | A1 | * | 8/2020 | Brooker | F16D 49/08 |

OTHER PUBLICATIONS

International Search Report issued for corresponding International Patent Application No. PCT/US 2020/015820, dated May 14, 2020.
Written Opinion issued by the International Searching Authority for corresponding International Patent Application No. PCT/US 2020/015820, dated May 14, 2020.

* cited by examiner

*Primary Examiner* — Vishal R Sahni
(74) *Attorney, Agent, or Firm* — Myers Wolin, LLC

(57) ABSTRACT

A braking device including: a piezoelectric element; and a braking portion. The braking portion is configured to be fixed to a member when the piezoelectric element is in a first state, and to be slidable along the member when the piezoelectric element is in a second state. The piezoelectric element changes from one state to another state when a voltage is applied.

16 Claims, 5 Drawing Sheets

PIEZOELECTRIC BRAKING DEVICE

CROSS REFERENCES TO RELATED APPLICATIONS

This application claims the benefit of U.S. Provisional Patent Application No. 62/800,094 filed on Feb. 1, 2019. The disclosure and entire teachings of U.S. Provisional Patent Application 62/800,094 are hereby incorporated by reference.

FIELD OF THE INVENTION

The present disclosure generally relates to a braking device, and more particularly, to a piezoelectric braking device.

BACKGROUND

In various mechanical systems such as an optical system having a microscope, fixing one component to another component may have to be rigid. However, such a rigid fixing cannot be sufficiently achieved for many reasons. For example, in some applications, position of a component may need to be changed frequently and rapidly. In traditional fixing mechanisms, it is not convenient to repeatedly fixing and releasing a component that requires changing its position frequently and rapidly during operation or setup.

Therefore, there is a need for mechanical systems so that components can be more rigidly fixed to each other as well as allowing frequent quick fix-release operations.

SUMMARY

An embodiment of the present disclosure provides a braking device including: a piezoelectric element; and a braking portion configured to fix to a member when the piezoelectric element is in a first state, and to release the member when the piezoelectric element is in a second state. The piezoelectric element changes from the first state to the second state when a voltage is applied to the piezoelectric element.

In one embodiment, the braking portion of the braking device is configured to surround the member to clamp the member. A force element may be used to provide the clamping force.

In one embodiment, the braking portion includes two ends facing to each other, and the braking portion is provided with a gap that is located between the two ends, and a distance between the two ends of the braking portion varies while the piezoelectric element changes from one state to another state. A clearance between the braking portion and the member may be adjustable. When the cross-section of the member is a circle, and the braking device also fixes the member from rotating.

In one embodiment, the braking device may be used for mounting and releasing of optical element from an optical post. For example, the braking device may be attached to a post holder or an optical mount, so that the position and angle of an optical element may be adjusted when the braking device releases the pole and then locked in place when the braking device fixes post.

In one embodiment, the braking device may be used in a gimbal having multiple pivots in which the braking device fixes and releases one or more of the multiple pivot pins.

An embodiment of the present disclosure provides a positioning system including at least one strut assembly that includes a braking device including a piezoelectric element; and a braking portion configured to fix to a member when the piezoelectric element is in a first state, and to release the member when the piezoelectric element is in a second state.

Some examples of the above embodiment may include: a hexapod having six strut assemblies with one or more of the braking devices, a tripod having three strut assemblies with one or more of the braking devices, or a monopod having one strut assembly with one braking device.

An embodiment of the present disclosure provides a linear drive including a first and second piezoelectric braking devices; a body connecting the two braking devices at two ends along a length of the body; and a processor configured to control the first and second braking devices and to change the length of the body between a first length and a second length, such that when the first braking device fixes to a member, then the second braking device releases the member and the length of the body is at the first length; and when the first braking device releases the member, then the second braking device fixes to the member and the length of the body is at the second length.

DETAILED DESCRIPTION OF THE PREFERRED EMBODIMENTS

Figure 1A:
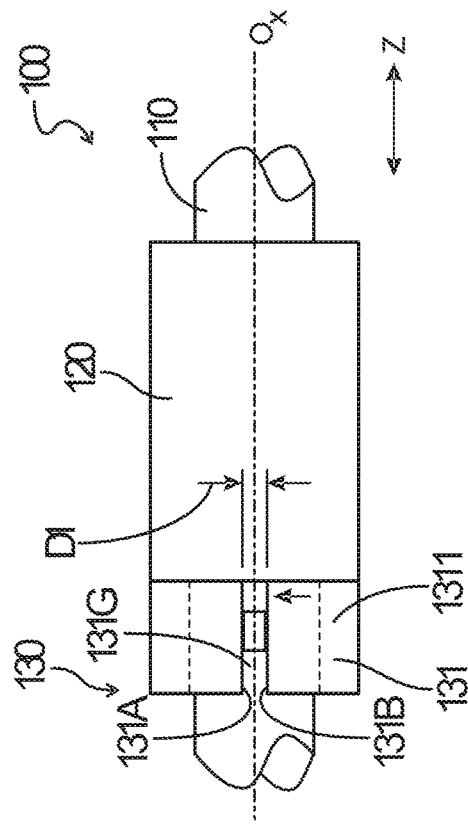
FIG. 1A illustrates a cross-sectional view of a structure according to one embodiment of the present disclosure.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 1B:
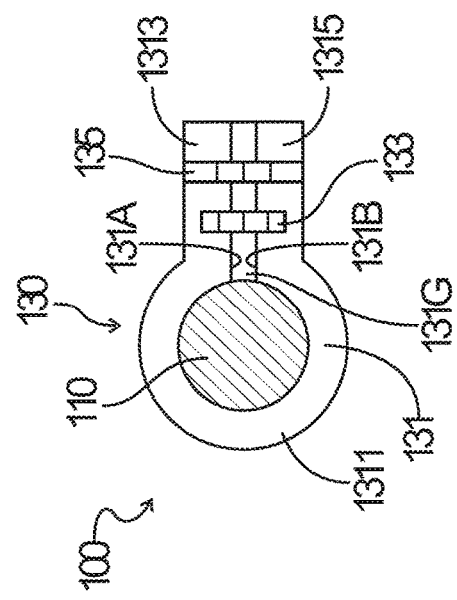
FIG. 1B illustrates a side view of a structure according to one embodiment of the present disclosure.

A braking device according to an embodiment is shown in FIGS. 1A and 1B. FIG. 1A illustrates a cross-sectional view of a structure according to one embodiment of the present disclosure. FIG. 1B illustrates a side view of a structure according to one embodiment of the present disclosure.

The structure 100 shown in FIGS. 1A and 1B may include a member 110, a supporter 120, and a braking device 130. The member 110 may include a longitudinal axis Ox. The member 110 may extends in a longitudinal axis direction Z. The member 110 may include a circular cross-section. The member 110 may be made of any kind of material, such as metal, plastic, and composite material. Note that the cross-section of the member 110 is not limited to a circle, any geometrical shape is possible as long as the braking device 130 is configured to grip one or more surfaces of the bar member. The supporter 120 may support the bar member 110 slidably in the longitudinal axis direction Z of the member 110. The supporter 120 may surrounds a part of the member 110. In one embodiment, the supporter 120 may include a hole that may have a circular cross-section that may accommodate a part of the member 110. Supporter 120 may be made of any kind of material, such as metal, plastic, and composite material.

The braking device 130 may be fixed to the supporter 120. The braking device 130 may be configured to brake the member 110. In one embodiment, the braking device 130 may be slidable along the member 110. The braking device 130 may be made of any kind of material, such as metal, plastic, and composite material. The braking device 130 may include a braking portion 131, a piezoelectric element 133, and a forcing element 135.

The braking portion 131 may be configured to fix to and be slidable along the member 110. The braking portion 131 may be fixed to the member 110 by clamping the member 110. The braking portion 131 may surrounds the member 110. In the illustrated example, the braking portion 131 may include a split ring 1311 and parts 1313 and 1315. The split ring 1311 may surround the member 110 to clamp the member 110. The split ring 1311 of the braking portion 131 may include two ends 131A and 131B. The two ends 131A and 131B may face to each other. The braking portion 131 may be provided with a gap 131G that is located between two ends 131A and 131B. The part 1313 may be connected to the split ring 1311 at a side of the end 131A. The part 1315 may be connected to the split ring 1311 at a side of the end 131B. The part 1315 may be spaced apart from the part 1313.

The piezoelectric element 133 may be engaged with the braking portion 131. In the example shown in FIGS. 1A and 1B, the piezoelectric element 133 may be disposed in the braking portion 131. Specifically, in FIGS. 1A and 1B, the piezoelectric element 133 may be disposed in a space formed by the parts 1313 and 1315 of the braking portion 131. The piezoelectric element 133 may be disposed along a direction perpendicular to the longitudinal axis direction Z of the member 110. In FIGS. 1A and 1B, the piezoelectric element 133 is disposed along a direction in which the two ends 131A and 131B are spaced apart from each other. In the illustrated example, the piezoelectric element 133 may include a linear shape.

The piezoelectric element 133 may be in a first state and a second state. When the piezoelectric element 133 is in the first state, the braking portion 131 may be fixed to the member 110. When the piezoelectric element 133 is in the second state, the braking portion 131 may not be fixed to the member 110, and may be slidable along the member 110. The member 110 may be adjusted to the supporter 120 in the longitudinal direction Z when the braking portion 131 does not fixed to the member 110. The state of the piezoelectric element 133 may change from one state to another state when a voltage is applied to the piezoelectric element. For example, the piezoelectric element 133 may expand in a longitudinal direction of the piezoelectric element 133 when a voltage is applied to the piezoelectric element 133. In this example, the first state of the piezoelectric element 133 may be an expanded state, and the second state of the piezoelectric element 133 may be a non-expanded state. Alternatively, the piezoelectric element 133 may contract in the longitudinal direction of the piezoelectric element 133 when a voltage is applied to the piezoelectric element 133. In this example, the first state of the piezoelectric element 133 may be a contracted state, and the second state of the piezoelectric element 133 may be a non-contracted state.

In the illustrated example shown in FIGS. 1A and 1B, a distance D1 between the two ends 131A and 131B of the braking portion 131 may vary while the piezoelectric element 133 expands or contracts.

As shown in FIGS. 1A and 1B, the structure 100 may further include a forcing element 135. The forcing element 135 may provide the braking portion 131 with a force by which the braking portion 131 clamps the member 110. Examples of the forcing element 135 include a screw, combination of a bolt and a nut, and a spring. In the example of FIGS. 1A and 1B, the forcing element 135 may fix one of the parts 1313 and 1315 of the braking portion 131 to the other one of the parts 1313 and 1315 of the braking portion 131.

Figure 2A:
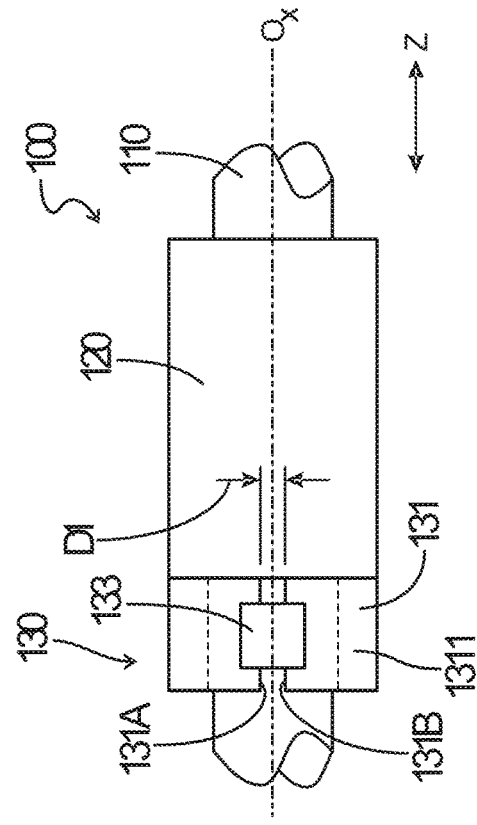
FIG. 2A illustrates a cross-sectional view of a structure according to another embodiment of the present disclosure.
Figure 2B:
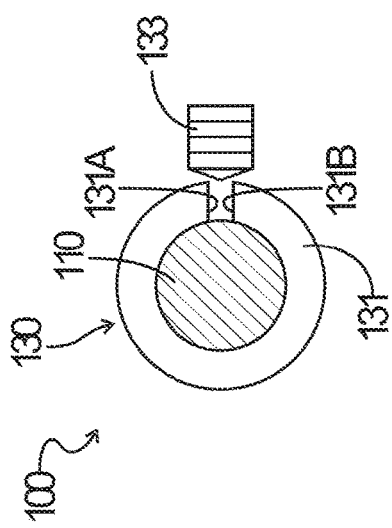
FIG. 2B illustrates a side view of a structure according to another embodiment of the present disclosure.

In another embodiment, as shown in FIGS. 2A and 2B, the piezoelectric element 133 may be disposed along a direction perpendicular to the direction in which the two ends 131A and 131B are spaced apart from each other. In the example of FIGS. 2A and 2B, the piezoelectric element 133 may include a wedge-shaped tip and the wedge-shaped tip of the piezoelectric element 133 may push the two ends 131A and 131B to expand the distance D1 when the piezoelectric element 133 changes. As such, the distance D1 between the two ends 131A and 131B of the braking portion 131 may vary while the piezoelectric element 133 expands or contracts.

In the embodiments shown in FIGS. 1A and 1B as well as FIGS. 2A and 2B, the member 110 can be rigidly fixed to the supporter 120 when the braking portion 131 of the braking device 130 is fixed to the member 110. This can enhance reliability of fixing of the member 110 to the supporter 120. In particular, the braking device 130 may lock rotational and longitudinal movements of the member 110 to the braking portion 130. In addition, the first and second states of the piezoelectric element 133 may be switched at a higher speed by switching application of a voltage to the piezoelectric element 133. Further, the braking device 130 is configured to adjust a tolerance between the braking portion 131 and the member 110.

Figure 3:
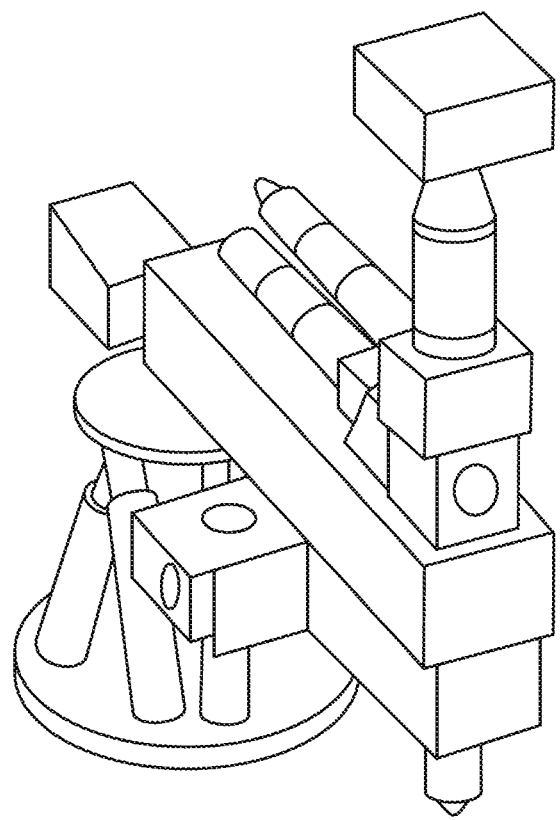
FIG. 3 is a perspective view of an incident angle tracking microscope mounted on a hexapod according to one embodiment.

The braking device discussed in view of FIGS. 1A-2B may be applied to various systems. One example of the application of the breaking device includes a adjustable stage for an optical element. In one embodiment, the stage is a hexapod. This allows for a virtual pivot point at which the platform may be rotated about. In other embodiments, the stage may include three strut assemblies arranged as a tripod configuration to provide three degrees of freedom movement of a platform, or include one strut assembly arranged as a monopod configuration to provide one degree of freedom movement of a platform. In these embodiments, one or more of the braking devices are mounted to the strut assembly and configured to brake a shaft from extending, retracting, or rotation FIG. 3 illustrates a non-limiting example that a microscope is mounted on an adjustable stage, so that the position and orientation of the entire microscope can be adjusted.

Figure 4:
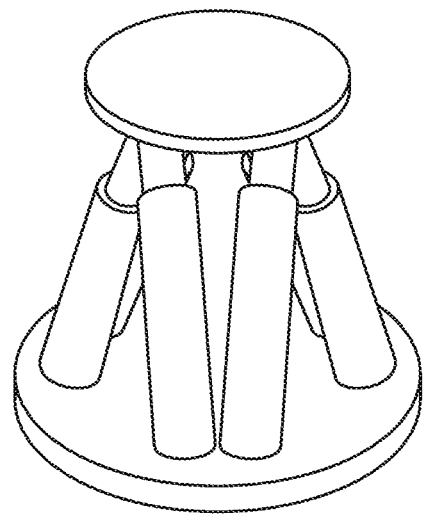
FIG. 4 is a perspective view of a hexapod according to one embodiment.

FIG. 4 is a perspective view of a stage that includes six strut assemblies arranged as a hexapod configuration according to an embodiment.

Figure 5:
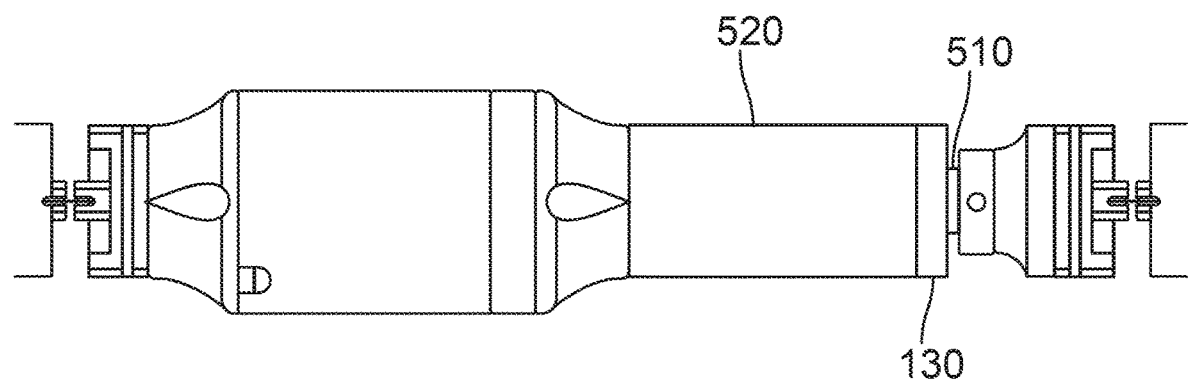
FIG. 5 shows a strut assembly according to one embodiment.

FIG. 5 shows a strut assembly according to an embodiment. A shaft in the strut assembly may extend or retract. In one embodiment, the strut assembly includes an actuator to control the extension and retraction of the shaft. In another embodiment, the shaft freely extends and retracts without an actuator.

The member 110 in FIGS. 1A-2B may be the shaft 510 in FIG. 5. The supporter 120 in FIGS. 1A-2B may be the housing 520. In addition, the braking device 130 in FIGS. 1A-2B may be located at the end of the housing through which the shaft extends or retracts. In addition, the flexure assembly may be locked when the piezoelectric element 133 is in the first state, and may be unlocked from the shaft 510 when the piezoelectric element in the second state. In another example, the member 110 in FIGS. 1A-2B may be an air cylinder of the strut assembly. In one example, the strut assembly may include two braking devices 130, and the two braking devices 130 may alternately perform locking and unlocking functions.

In the embodiments shown in FIG. 5, each strut assembly may be locked when the piezoelectric element 133 is in the first state, and each strut assembly may be unlocked to be adjusted when the piezoelectric element 133 is in the second state.

In the present embodiments, the shaft 510 can be rigidly fixed to the housing 520 for the same reasons discussed above in view of FIGS. 1A-2B. This can enhance reliability of fixing of the shaft 510 to the housing 520. In addition, as discussed above, the first and second states of the piezoelectric element may be switched at a higher speed by switching application of a voltage to the piezoelectric element. Therefore, the position of the shaft 510 relative to the housing 520 can be conveniently adjusted.

Furthermore, the braking portion may be precisely honed to the shaft 510 to create a very tight tolerance between the shaft 510 and the braking portion, so that the piezoelectric element 133 may need only to expand or contract about 10-20 microns to lock or unlock the brake.

Further, the platform of the apparatus may be a gimbal platform. When the bar member and/or pivot pins of the gimbal apparatus are not clamped by the braking device 130, the stage of the apparatus of FIG. 3 may become in a stable posture by gravitation. Then, the bar member and/or the pivot pins may be clamped by the braking device 130. This means that the stage of the apparatus may move like a gimbal apparatus. In such a case, the stage of the apparatus can be adjusted without an actuator in a strut assembly, and a user may adjust the stage by unlocking the brakes and adjusting the stage to a desired position and then locking the stage in place.

Further, in one embodiment, multiple braking devices may be used together in a system, in which individual braking devices are controlled to fix or release a member according to a programmable sequence. For example, in a system including a first and second braking devices, and a processor is configured to control the first and second braking devices, such that: when the first braking device is in the first state, the second braking device is in the second state; and when the first braking device is in the second state, the second braking device is in the first state. In the application of a linear drive, the first and second braking devices are connected by a bar that can expand and contract. A processor may control the states of the two braking devices and the bar in a sequence such that when the first braking device fixes to a member, then the second braking device releases the member and the length of the body is at the first length; and when the first braking device releases the member, then the second braking device fixes to the member and the length of the body is at the second length. Such sequence of actions would cause the drive to travel along the member.

It is contemplated that one or more of the braking devices may be used in conjunction with or without other components in a number of systems that may require tight tolerances between moving parts with rapid and controllable braking actions.

Figure 6:
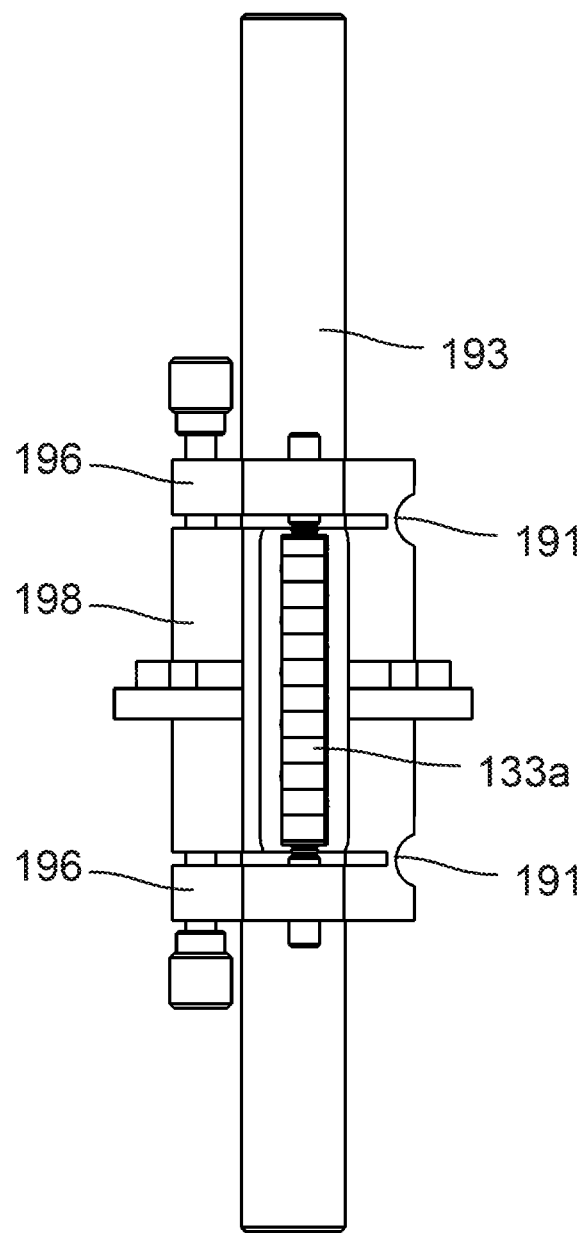
FIGS. 6 and 7 illustrate views of a braking structure according to another embodiment of the present disclosure.
Figure 7:
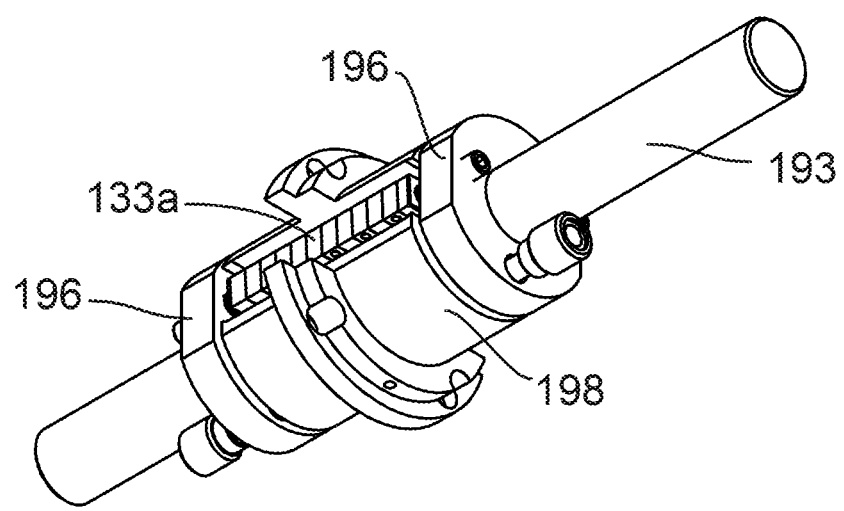

FIGS. 6 and 7 illustrate views of a braking structure according to another embodiment of the present disclosure. In FIGS. 6 and 7, a piezoelectric element 133a may expand along the axis of a shaft 193. In one embodiment, the braking structure shown in FIGS. 6 and 7 may include at least one flexure 191 (for example, two flexures 191 in FIGS. 6 and 7) between portions 196 and 198. In another embodiment, the portions 196 and 198 are connected via a hinge or equivalent moveable linking means. In the illustrated example, when the piezoelectric element 133a expands, the portions 196 of the structure may move relative to 198 via the flexures 191 to twist and bind against the shaft 193 to effect the braking.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A braking device comprising:
a piezoelectric element; and
a braking portion comprising a split ring configured to surround a member,
wherein the split ring is a ring that is split at a location on the ring such that a gap is formed between a first split end of the rind and a second split end of the ring, with the first and second split ends facing each other, and a distance of the gap between the facing surfaces of the first and second ends varies while the piezoelectric element changes from one state to another state;
wherein the braking portion is configured to clamp the member when the piezoelectric element is in a first state, and to release the member when the piezoelectric element is in a second state;
wherein the piezoelectric element changes from the first state to the second state when a voltage is applied to the piezoelectric element.

2. The braking device of claim 1, further comprising a forcing element configured to providing a clamping force.

3. The braking device of claim 1, wherein a clearance between the split ring and the member is adjustable.

4. The braking device of claim 1, wherein the cross-sectional shape of the member is a circle, and the braking device further configured to prevent the member from rotating when the piezoelectric element is in the first state.

5. An adjustable optical mount comprising a braking device of claim 1 configured to move along a length of a post or rotate about an axis of the post, such that an adjustment of the location or direction of the optical mount can be made when the braking device releases the post, and then the optical mount can be locked in place when the braking device fixes to the post.

6. A gimbal comprising multiple pivots, and one or more of the braking devices of claim 1 configured to fix and release one or more pins of the multiple pivots.

7. A positioning system comprising at least one strut assembly comprising the braking device of claim 1.

8. The positioning system of claim 7, further comprising a baseplate and a platform,
wherein a first end of each of the at least one strut assembly is connected at a predefined location on top surface of the base plate and a second end of each of the at least one strut assembly is connected at a corresponding predefined location on the bottom surface of the platform.

9. The positioning system of claim 7, wherein the at least one strut assembly comprises:
a linear actuator configured to change a distance between the two ends of the strut assembly along a length of the strut assembly;
the at least one strut assembly is locked in position when the piezoelectric element is in the first state, and unlocked from the shaft when the piezoelectric element in the second state.

10. The positioning system of claim 8, wherein the at least one strut assembly comprises six strut assemblies arranged as a hexapod configuration to provide six degrees of freedom movement of the platform.

11. The positioning system of claim 7, wherein the at least one strut assembly comprises: three strut assemblies arranged as a tripod configuration.

12. The positioning system of claim 7, wherein the at least one strut assembly comprises one strut assembly arranged as a monopod configuration.

13. The system of claim 8, wherein the at least one strut assembly comprises an air cylinder, and the air cylinder includes the member of the braking device.

14. A system comprising a first and second braking devices of claim 1, and a processor configured to control the first and second braking devices, such that: when the first braking device is in the first state, the second braking device is in the second state; and when the first braking device is in the second state, the second braking device is in the first state.

15. A linear drive comprising a system of claim 14, wherein the first and second braking devices are connected by a bar that expands and contracts in synchronous with the state changes of the first and second braking devices.

16. A braking device comprising:
a piezoelectric element; and
a braking portion surrounding a member about an axis of the member;
wherein the braking portion of the braking device comprises a first ring and a second ring stacked above the first ring, a part of the first ring and a part of the second ring being connected via a flexure, and a gap is formed between the respective unconnected parts of the first and second rings;
wherein the piezoelectric element is configured to move the first ring relative to the second ring about the flexure;
wherein in the braking portion is configured to fix to the member when the piezoelectric element is in the first state and to release the member when the piezoelectric element is in the second state;
wherein when the piezoelectric element is in the second state, the axes of the first ring and the second ring are aligned with the axis of the member;
wherein when the piezoelectric element is in the first state, at least one of the axes of the first ring and the second ring is not aligned with the axis of the member.

* * * * *